(12) United States Patent
Wang

(10) Patent No.: US 12,393,058 B1
(45) Date of Patent: Aug. 19, 2025

(54) CONTACT LENS

(71) Applicant: YONG DA LI TECHNOLOGY CO., LTD., Taichung (TW)

(72) Inventor: Chiang-Chuan Wang, Fuxing Township (TW)

(73) Assignee: YONG DA LI TECHNOLOGY CO., LTD, Taichung (TW)

( * ) Notice: Subject to any disclaimer, the term of this patent is extended or adjusted under 35 U.S.C. 154(b) by 0 days.

(21) Appl. No.: 18/991,582

(22) Filed: Dec. 22, 2024

(51) Int. Cl.
*G02C 7/04* (2006.01)

(52) U.S. Cl.
CPC ..................... *G02C 7/04* (2013.01)

(58) Field of Classification Search
CPC ........................................ G02C 7/04
USPC ..................... 351/159.02, 159.04
See application file for complete search history.

(56) References Cited

U.S. PATENT DOCUMENTS

| | | | | |
|---|---|---|---|---|
| 4,621,912 A * | 11/1986 | Meyer | ................. | B23K 26/382 |
| | | | | 219/69.11 |
| 5,104,213 A * | 4/1992 | Wolfson | ................. | G02B 1/043 |
| | | | | 351/159.02 |
| 6,036,314 A * | 3/2000 | Wolfson | ................. | G02C 7/04 |
| | | | | 351/159.02 |
| 2002/0075447 A1* | 6/2002 | Andino | ............. | B29D 11/0048 |
| | | | | 351/159.02 |
| 2020/0264450 A1* | 8/2020 | de Juan, Jr. | ............ | G02C 7/047 |

* cited by examiner

*Primary Examiner* — William R Alexander

(57) ABSTRACT

An oxygen permeable contact lens has a convex arc-shaped outer surface and a concave arc-shaped inner surface located on an opposite side of the outer surface; wherein the contact lens is processed by a laser straight line penetrating the outer surface and the inner surface to provide at least one oxygen permeable hole.

5 Claims, 7 Drawing Sheets

CONTACT LENS

BACKGROUND OF THE INVENTION

Field of Invention

The present invention relates to a contact lens, and more particularly to an oxygen permeable contact lens.

Description of the Related Art

Typical contact lens is prone to problems such as poor air permeability, oxygen permeability, and lack of hydrophilicity, which not only affects the self-lubricating mechanism of the eyes, but also leading to eye dryness, burning sensations, fatigue and other discomforts. Since the cornea has no blood vessels, its oxygen supply mainly relies on oxygen in the air. If the contact lens has poor oxygen permeability, the contact lens will prevent oxygen from reaching the eyes, which increases the risk of eyeball infection with bacterial keratitis. In severe cases, it can even cause corneal keratitis, and lack of oxygen can cause problems such as red eyes, blurred vision, and even corneal damage.

Therefore, it is desirable to provide oxygen permeable contact lens for a grinding machine to mitigate and/or obviate the aforementioned problems.

SUMMARY OF THE INVENTION

An objective of present invention is to provide oxygen permeable contact lens, which is capable of improving the above-mention problems.

In order to achieve the above-mentioned objective, an oxygen permeable contact lens has a convex arc-shaped outer surface and a concave arc-shaped inner surface located on an opposite side of the outer surface; wherein the contact lens is processed by a laser straight line penetrating the outer surface and the inner surface to provide at least one oxygen permeable hole.

Other objects, advantages, and novel features of invention will become more apparent from the following detailed description when taken in conjunction with the accompanying drawings.

DETAILED DESCRIPTION OF PREFERRED EMBODIMENT

Figure 1:
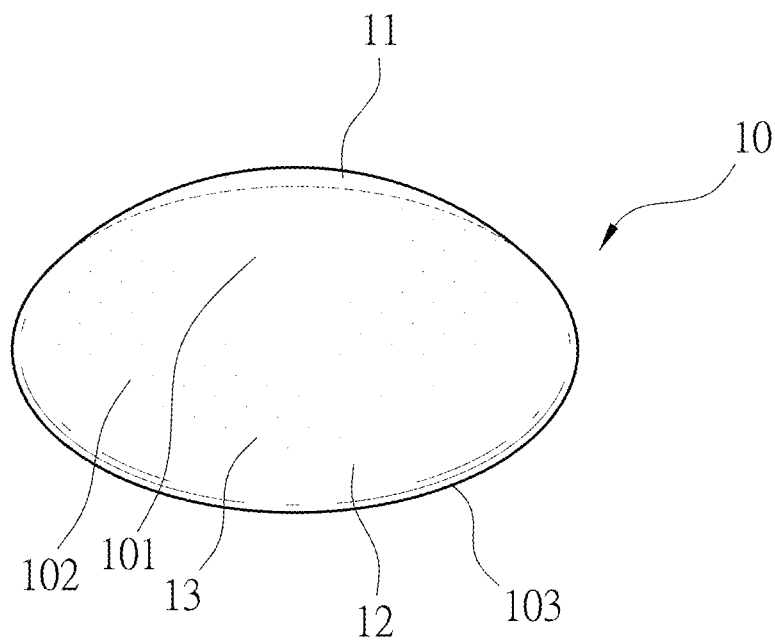
FIG. 1 is a perspective view of a preferred embodiment according to the present invention.
Figure 2:
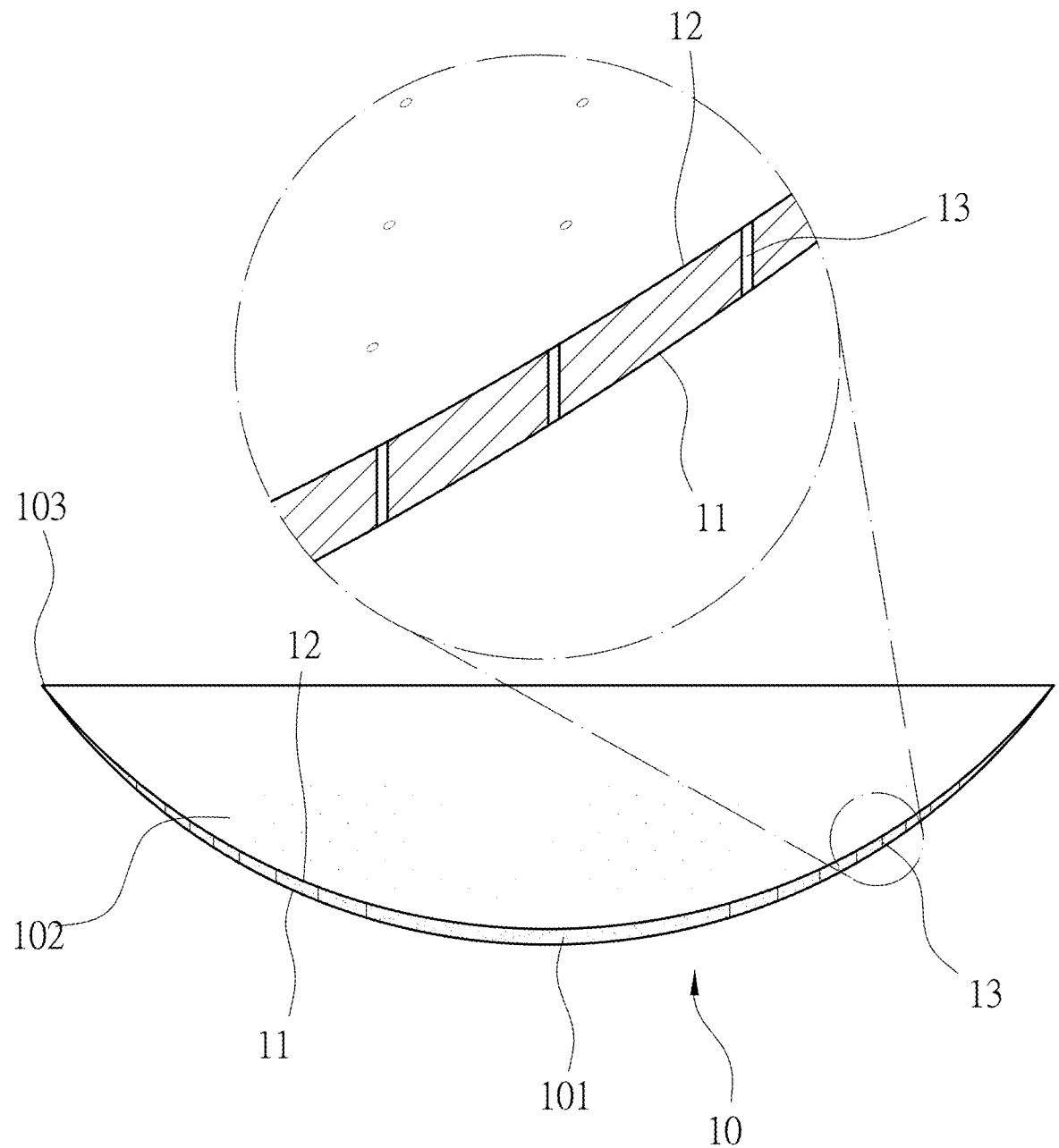
FIG. 2 is a partially enlarged cross-sectional view of the plan view of the preferred embodiment according to the present invention.

First, please refer to FIGS. 1 and 2. A contact lens 10 comprises a convex arc-shaped outer surface 11 and a concave arc-shaped inner surface 12 located on an opposite side of the outer surface 11. The contact lens 10 is processed by a laser straight line penetrating the outer surface 11 and the inner surface 12 to provide at least one oxygen permeable hole 13. The oxygen permeable hole 13 has a diameter size from 0.1 mm to 0.01 mm, and the oxygen permeable hole 13 increases the air permeability and oxygen permeability of the contact lens 10, improving the wearing comfort of the contact lens 10.

Figure 3:
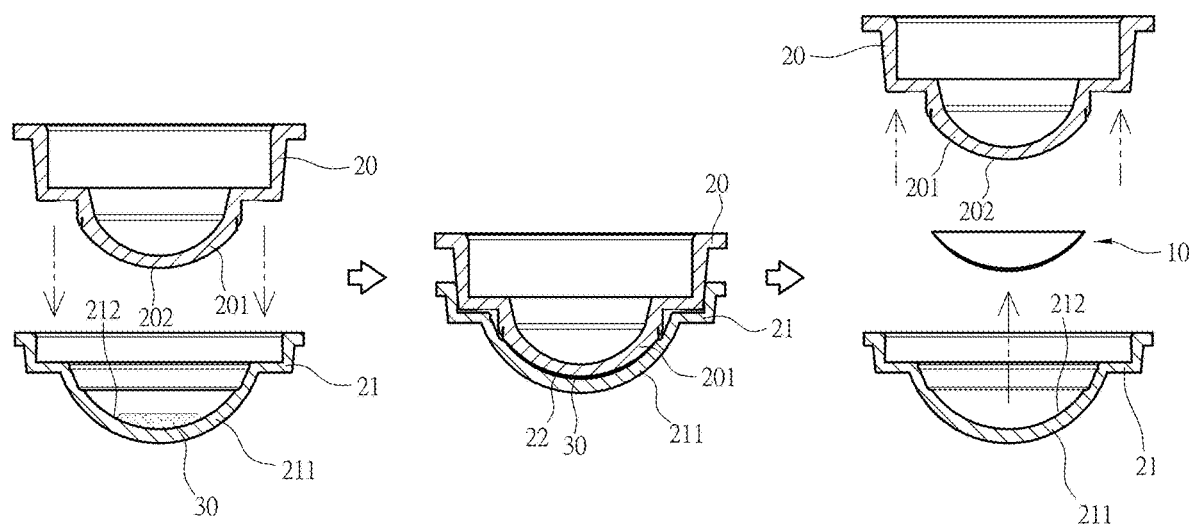
FIG. 3 is a molding flow chart of the preferred embodiment according to the present invention.
Figure 4:
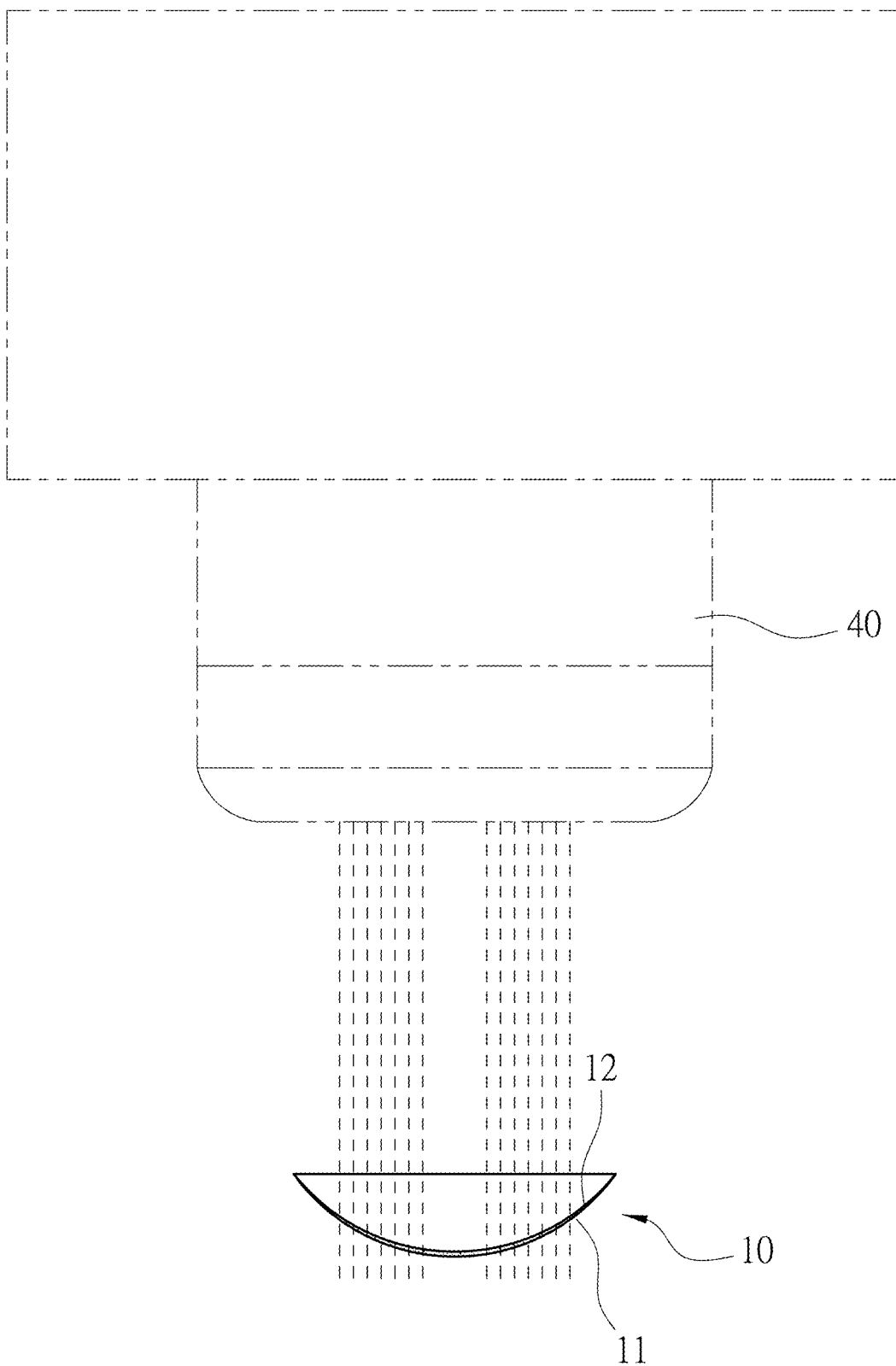
FIG. 4 is a schematic diagram of the laser drilling operation of the preferred embodiment according to the present invention.
Figure 5:
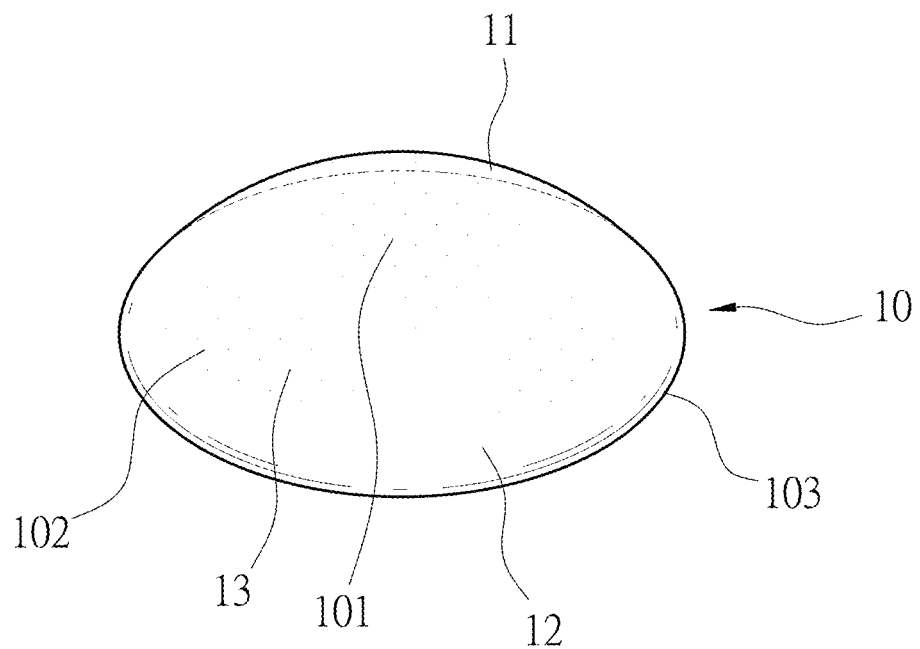
FIG. 5 is a schematic diagram of another embodiment according to the present invention.

Furthermore, as shown in FIGS. 3 and 4, the contact lens 10 is formed by an upper mold 20 and a lower mold 21. The upper mold 20 has a first bowl portion 201, and an outer wall of the bowl portion 201 forms a convex arc surface 202; the lower mold 21 has a second bowl portion 211, and an inner wall of the second bowl portion 211 forms a concave arc surface 212. When the upper mold 20 and the lower mold 21 are closed, a forming chamber 22 can be created through the space between the first bowl portion 201 and the second bowl portion 211, a polymer material 30 is injected into the forming chamber 22, and then the polymer material in the forming chamber is heated or illuminated for curing. After the molding and curing, the contact lens 10 can be removed and taken out of the forming chamber 22. The contact lens 10 includes an optical zone 101, a non-optical zone 102 and an outer edge 103. Then the contact lens 10 is processed through a laser equipment 40 to be perforated, and a laser is used to penetrate the outer surface 11 and the inner surface 12 of the contact lens 10 to form at least one oxygen permeable hole 13. As shown in FIG. 1, in this embodiment, there are plurality of the oxygen permeable holes 13 provided through the outer and inner surfaces 11 and 12 of the contact lens 10, wherein the oxygen permeable holes 13 are at least formed in the non-optical zone 102. In addition, as shown in FIG. 5, the oxygen permeable holes 13 can also be formed equidistantly in the optical zone 101 and the non-optical zone 102.

With the structure of the above specific embodiment, the following benefits can be obtained: the contact lens 10 utilizes a laser to penetrate the outer surface 11 and the inner surface 12 to form at least one oxygen permeable hole 13, such that the contact lens 10 is capable of having the oxygen permeable hole 13 in an instant, which helps to improve product yield by avoiding multi-layer and multi-processing, and allows the oxygen permeable hole 13 to have extremely small diameter and smooth cutting edges. The oxygen permeable hole 13 is very subtle and does not cause invasive discomfort to the eyeballs.

Figure 6:
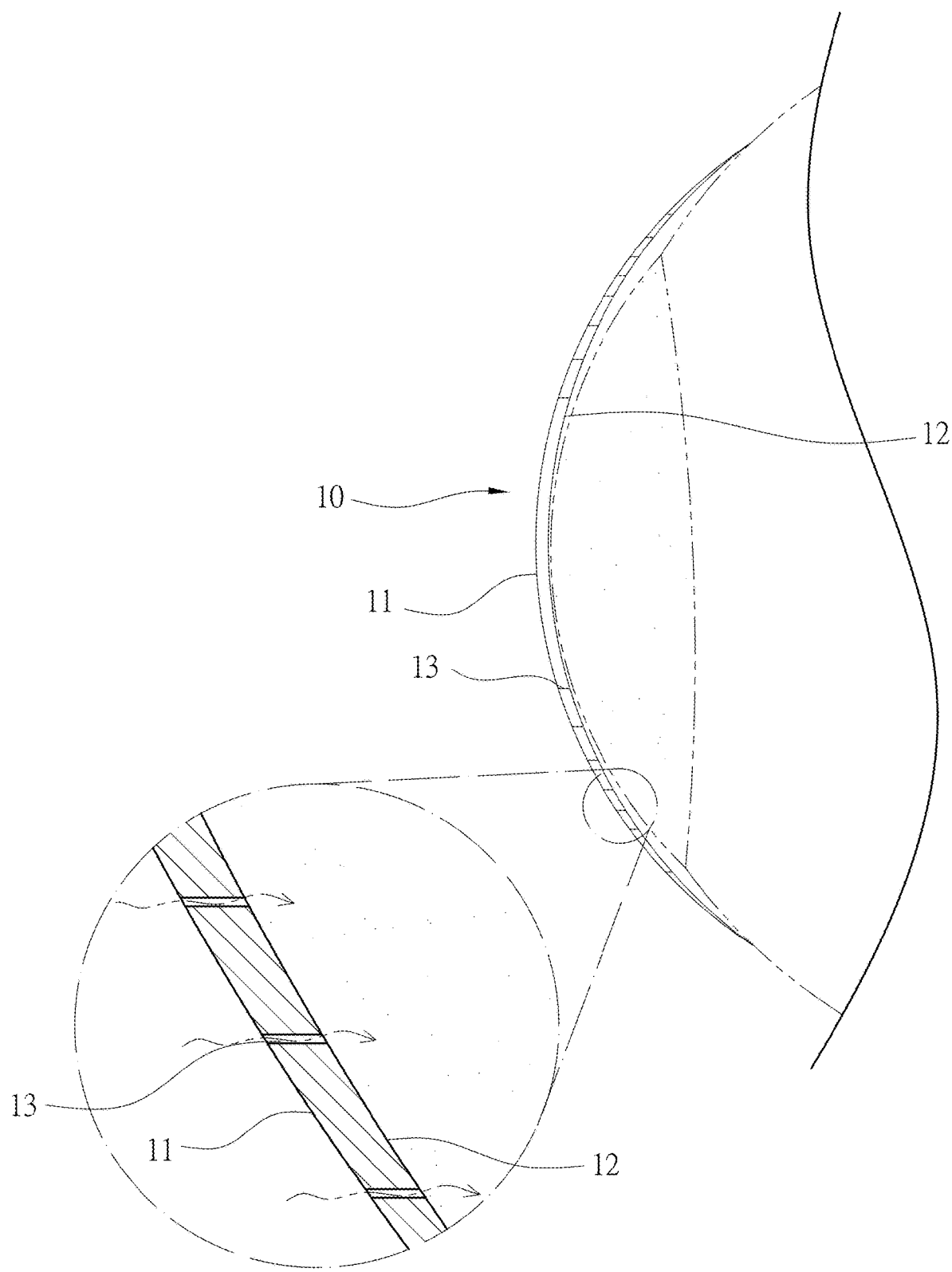
FIG. 6 is a schematic diagram of wearing the contact lens according to the present invention.
Figure 7:
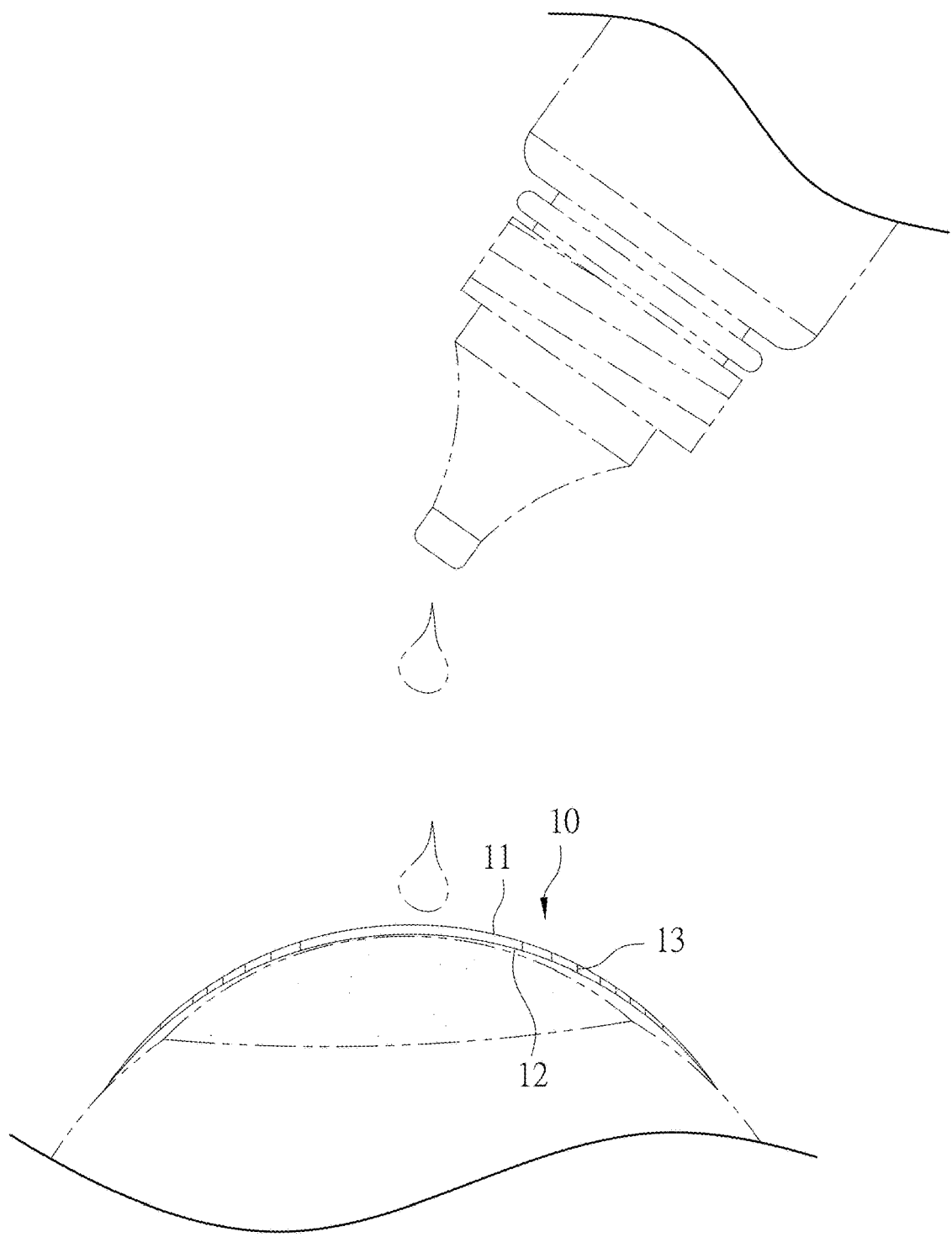
FIG. 7 is a schematic diagram of the use state of the eye drops or artificial tears according to the present invention.

In addition, the oxygen permeable hole 13 on the outer and inner surfaces 11 and 12 can greatly increase the oxygen permeability of the contact lens 10, so that the eyeball can obtain oxygen through the oxygen permeable hole 13 in a timely manner (as shown in FIG. 6), and increase the circulation effect of tears and moisture, greatly reducing discomfort symptoms such as dryness, stinging or foreign body sensation in the eyes, further improving the comfort of wearing, and effectively reducing the risk of eye infection. Moreover, the use of eye drops or artificial tears can also achieve the moistening effect of the eyeballs through the oxygen permeable hole 13 (as shown in FIG. 7), and it has the convenience of soothing the eyeballs.

Although the present invention has been explained in relation to its preferred embodiment, it is to be understood that many other possible modifications and variations can be made without departing from the spirit and scope of invention as hereinafter claimed.

What is claimed is:

1. An oxygen permeable contact lens comprising a convex arc-shaped outer surface and a concave arc-shaped inner surface located on an opposite side of the outer surface;

wherein the contact lens is processed by a laser straight line penetrating the outer surface and the inner surface to provide at least one oxygen permeable hole; and wherein the oxygen permeable contact lens is formed by utilizing an upper mold and a lower mold, the upper mold having a first bowl portion, an outer wall of the first bowl portion forming a smooth convex arc surface, the lower mold having a second bowl portion, an inner wall of the second bowl portion forming a smooth concave arc surface, the upper mold and the lower mold defining a cavity therebetween configured to accept a polymer material, the polymer material in the cavity solidifying by heat or light to form the contact lens that has a smooth convex arc-shaped outer surface and a smooth concave arc-shaped inner surface located on an opposite side of the smooth outer surface and that is processed by the laser to form the at least one oxygen permeable hole that is configured to increase air permeability and oxygen permeability of the contact lens.

2. The oxygen permeable contact lens as claimed in claim 1, wherein the oxygen permeable hole has a diameter size from 0.1 mm to 0.01 mm.

3. The oxygen permeable contact lens as claimed in claim 1, wherein the contact lens has a plurality of oxygen permeable holes penetrating the outer surface and the inner surface.

4. The oxygen permeable contact lens as claimed in claim 3, wherein the contact lens includes an optical zone, a non-optical zone, an outer edge, and a plurality of oxygen permeable holes are formed in at least the non-optical zone.

5. The oxygen permeable contact lens as claimed in claim 4, wherein the plurality of oxygen permeable holes are equidistantly formed in the optical zone and the non-optical zone.

* * * * *